United States Patent
Tat et al.

(10) Patent No.: US 8,527,006 B2
(45) Date of Patent: Sep. 3, 2013

(54) PROCESSING SYSTEM, WIRELESS DEVICE AND METHOD

(75) Inventors: Nguyen Quan Tat, Reading (GB); Stuart Ian Geary, Fleet (GB); Jari Ruohonen, Tampere (FI); Andrew Bishop, Guildford (GB); Sami Jutila, Oulu (FI); Alexander Graham Charles, Fleet (GB); Roy Hansen, Dragør (DK)

(73) Assignee: Renesas Mobile Corporation, Tokyo (JP)

( * ) Notice: Subject to any disclaimer, the term of this patent is extended or adjusted under 35 U.S.C. 154(b) by 85 days.

(21) Appl. No.: 13/285,926

(22) Filed: Oct. 31, 2011

(65) Prior Publication Data

US 2013/0109436 A1    May 2, 2013

(30) Foreign Application Priority Data

Oct. 28, 2011  (GB) .................... 1118681.4

(51) Int. Cl.
*H04B 1/38* (2006.01)
*H04K 3/00* (2006.01)

(52) U.S. Cl.
USPC ....................... 455/558; 455/552.1

(58) Field of Classification Search
USPC .................. 455/552.1, 553.1, 558
See application file for complete search history.

(56) References Cited

U.S. PATENT DOCUMENTS

| | | |
|---|---|---|
| 2010/0240414 A1 | 9/2010 | Lotenberg |
| 2011/0117909 A1 | 5/2011 | Cao et al. |
| 2011/0151858 A1 | 6/2011 | Lai |
| 2011/0151930 A1 | 6/2011 | Lee |
| 2011/0237297 A1 | 9/2011 | Shin |
| 2012/0093075 A1 | 4/2012 | Derkach et al. |

FOREIGN PATENT DOCUMENTS

| | | |
|---|---|---|
| EP | 0 941 002 A2 | 9/1999 |
| EP | 2 227 049 A1 | 9/2010 |
| EP | 2 384 061 A2 | 11/2011 |
| WO | WO 2011/084963 A2 | 7/2011 |
| WO | WO 2011/140781 A1 | 11/2011 |

OTHER PUBLICATIONS

UK IPO Combined Search and Examination Report under Section 17 and 18(3) dated Feb. 27, 2012 issued in a related British Application No. GB 1118681.4 (5 pages).
PCT International Search Report mailed Feb. 18, 2013 issued in a related PCT application No. PCT/IB2012/055886 (3 pages).
UKIPO Search Report under Section 17 dated May 4, 2012 issued in a related British Application No. GB1121894.8 (1 page).
A Non-Final Office Action dated Mar. 15, 2013, which is issued in connection with U.S. Appl. No. 13/408,186 filed Feb. 29, 2012 (12 pages).

*Primary Examiner* — Lee Nguyen
(74) *Attorney, Agent, or Firm* — Lucas & Mercanti LLP; Robert P. Michal

(57) ABSTRACT

A wireless device has at least a first modem and a second modem and at least a first SIM and a second SIM. The first modem supports a different level of service than the second modem. A processing system of the wireless device selectively reconfigures the connection of the first modem and the second modem to the SIMs. In a first mapping configuration, the first SIM is connected to the first modem and the second SIM is connected to the second modem. In a second mapping configuration, the second SIM is disconnected from the second modem, and the first SIM is disconnected from the first modem and is connected to the second modem thereby to obtain a different level of service for the first SIM than in the first mapping configuration.

22 Claims, 7 Drawing Sheets

PROCESSING SYSTEM, WIRELESS DEVICE AND METHOD

TECHNICAL FIELD

The present invention relates to a wireless device, apparatus for a wireless device and a method of operating a wireless device.

BACKGROUND

A multi-SIM (subscriber identity module) wireless device, including particularly mobile devices such as mobile phones (including so-called "smart phones"), personal digital assistants, tablet and laptop computers, etc., can hold two or more SIM cards. Currently, such devices can typically hold two SIM cards, though phones that can hold three SIM cards are now available and it is likely that phones and other wireless devices that can hold more SIM cards will become available. For simplicity and brevity, reference will often be made in this specification to a dual-SIM device, which can operate with two networks and/or tariff arrangements, etc., but it will be understood that much of what is described herein can be applied to a multi SIM wireless device having in principle any number of SIMs for operating with a corresponding number of networks and/or tariff arrangements, etc.

It is mentioned here that there are proposals to replace SIM (subscriber identity module) cards with SIM functionality provided by software in the device. Reference will be made in this specification generally to "SIM" to mean that part of a device that provides for the subscriber identity module functionality whether provided by a physical card, software elsewhere in the device, or any other suitable arrangement.

Dual-SIM operation allows the use of two services without the need to carry two devices at the same time. For example, the same handset can be used for business and private use with separate numbers and bills. As another example, the same handset can be used for travel, with one SIM being for use in the home country and the other SIM being for the country visited. As another example, both SIMs may be used with the same network operator, for example to achieve a higher total bandwidth for data connections. As yet another example, the device may contain both cellular and non-cellular radios which are used for voice and data communication respectively using the different SIMs. In any event, using multiple SIMs allows the user to take advantage of different pricing plans for calls and text messages to certain destinations as well as mobile data usage, and/or to keep personal and business use separate for example, and/or to achieve higher bandwidth, and/or to obtain coverage across different networks using a single handset. With this multiple SIM functionality, the SIMs can in general be from any network operator. Some of the embodiments described herein are particularly concerned with mobile wireless devices that have two (or more) SIMs and two or more "radio systems" or modems.

There are several types of multiple SIM devices known in the prior art. For example, a Dual SIM Dual Standby device can support two SIMs, which can simultaneously use one modem. Such devices are able to camp on two networks simultaneously, allowing the user to choose which SIM they want to use. However, these devices can only support call or data sessions to one SIM at a time, and the unused SIM is redundant during such sessions and remains in an active state.

As another example, a Dual SIM Dual Call device can support two SIMs each connected to a different modem. Such devices can support calls and data sessions via both SIMs simultaneously, allowing, for example, one SIM to be engaged in a call session and the other SIM to be simultaneously engaged in a data session. There is growing demand for multi-SIM devices which can support a plurality of SIMs in call/data sessions simultaneously. However, this requires a plurality of modems to connect to the plurality of SIMs. Increasing the number of modems in a wireless device can substantially increase the cost of the device, particularly if the modems are sophisticated, "high end" modems.

SUMMARY

In a first exemplary embodiment of the invention, there is apparatus comprising: at least one processor; and at least one memory including computer program code; the at least one memory and the computer program code being configured to, with the at least one processor, cause the apparatus at least to: selectively reconfigure the connection of at least a first modem and a second modem of a wireless device to at least a first SIM and a second SIM of the wireless device in use such that, in a first mapping configuration, said first SIM is connected to said first modem and said second SIM is connected to said second modem and, in a second mapping configuration, said second SIM is disconnected from said second modem, and said first SIM is disconnected from said first modem and is connected to said second modem thereby to provide a different level of service for the first SIM than in the first mapping configuration.

In a second exemplary embodiment of the invention, there is a wireless device, the wireless device comprising: at least a first modem and a second modem, the first modem supporting a different level of service than the second modem; at least one processor; and at least one memory including computer program code; the at least one memory and the computer program code being configured to, with the at least one processor, cause the apparatus at least to: selectively reconfigure the connection of the first modem and the second modem to at least a first SIM channel and a second SIM channel of the wireless device in use such that, in a first mapping configuration, the first SIM channel is connected to the first modem and the second SIM channel is connected to the second modem and, in a second mapping configuration, the second SIM channel is disconnected from the second modem, and the first SIM channel is disconnected from the first modem and is connected to the second modem thereby to provide a different level of service for the first SIM channel than in the first mapping configuration.

In a third exemplary embodiment of the invention, there is a method of operating a wireless device, the wireless device comprising at least one processor, at least one memory including computer program code, at least a first SIM and a second SIM, and at least a first modem and a second modem, the first modem supporting a different level of service than the second modem, the method comprising: the at least one processor selectively reconfiguring the connection of the first modem and the second modem to the first SIM and the second SIM such that, in a first mapping configuration, the first SIM is connected to the first modem and the second SIM is connected to the second modem and, in a second mapping configuration, the second SIM is disconnected from the second modem, and the first SIM is disconnected from the first modem and is connected to the second modem thereby to provide a different level of service for the first SIM than in the first mapping configuration.

There is also provided a computer program comprising code such that when the computer program is executed on a computing device, the computing device is arranged to carry out a method as described above. There may also be provided a non-transitory computer-readable storage medium comprising a set of computer-readable instructions stored thereon, which, when executed by a processing system, cause the processing system to carry out a method as described above.

Further features and advantages of the invention will become apparent from the following description of preferred embodiments of the invention, given by way of example only, which is made with reference to the accompanying drawings.

DETAILED DESCRIPTION

Figure 1:
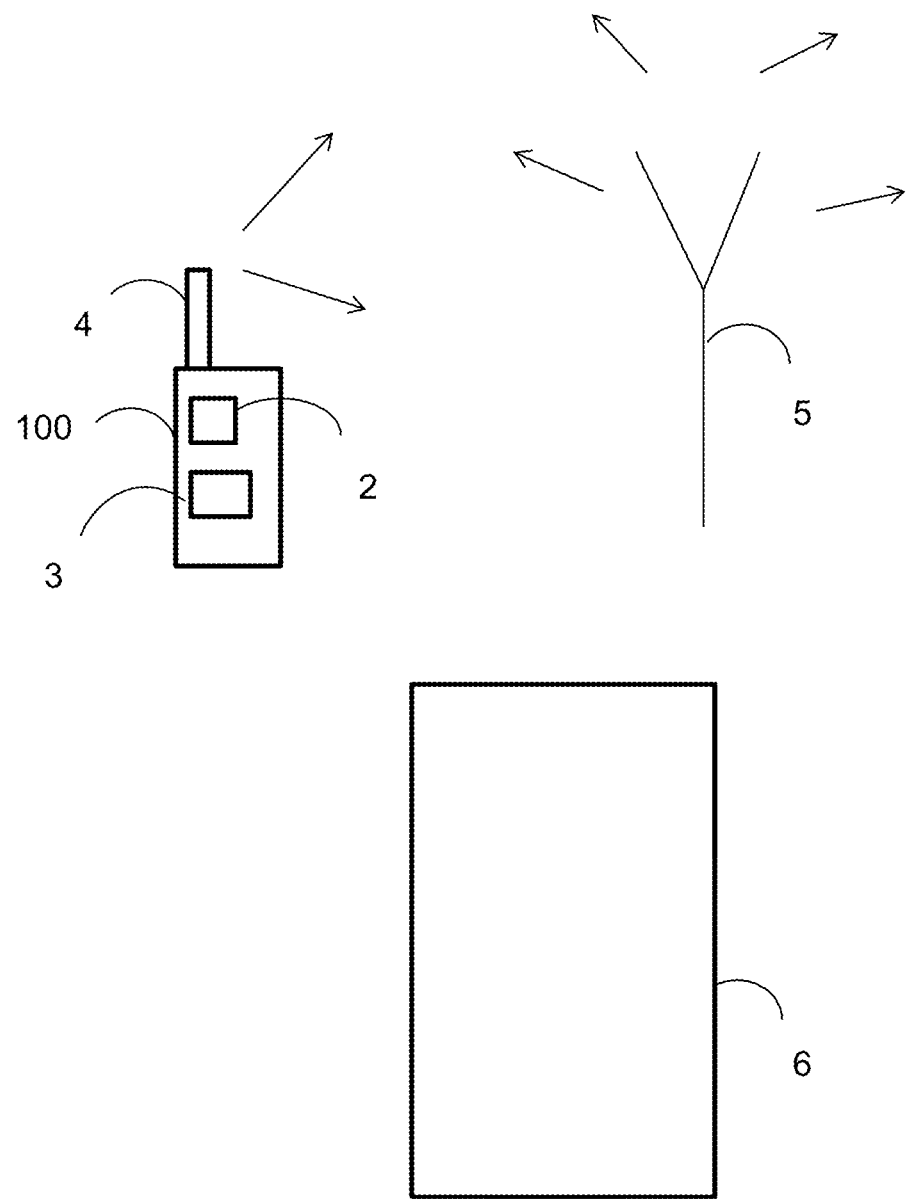
FIG. 1 shows a block diagram illustrating schematically an example of a wireless device and a wireless network.

Selectively disconnecting the first SIM from the first modem and then connecting it to the second modem in accordance with the exemplary embodiments means that the level of service provided to the first SIM can be changed. This for example allows the first SIM to make use of features provided or supported by the second modem that are not provided or supported by the first modem. For example, the first SIM can be selectively connected to a modem that supports higher levels of data services. Examples of other factors for determining which SIM to connect to which modem are discussed further below.

In an embodiment, the apparatus is constructed and arranged such that said second SIM is connected to said first modem in the second mapping configuration. This means that both SIMs are connected to modems, and the modems can thus both engage in call/data sessions simultaneously in a new configuration that may be more appropriate for the services offered by the respective SIMs.

In an embodiment, the apparatus is constructed and arranged such that disconnection of said first SIM from said first modem and connection of said first SIM to said second modem is accompanied by switching a SIM context for said first SIM from said first modem to said second modem. The switching of SIM context can be considered to be achieved almost instantaneously, thus allowing the disconnection and reconnection of the SIM to be achieved on the fly and avoiding the need to turn off and restart or reboot the wireless device.

In an embodiment, the apparatus is constructed and arranged such that prior to attempting to change a mapping configuration for a SIM of the wireless device, the processing system determines whether the change to the mapping configuration for said SIM of the wireless device can be carried out prior to a next operation of the modem to which said SIM is about to connect, and the processing system initiates the change to the mapping configuration for the SIM if it is determined that the change to the mapping configuration can be carried out prior to a next operation of the modem to which said SIM is about to connect, and otherwise the processing system does not initiate the change to the mapping configuration. The next activity could be a scheduled activity event like DRX (discontinuous reception) paging reception in DRX mode, or some hardware activity in active mode. Modem hardware is typically controlled by modem software, which uses SIM context to monitor the state of the SIM to which the modem is connected. Thus, switching SIM context while the hardware is carrying out operations can cause the software to lose SIM context mid-activity.

In an embodiment, the apparatus is constructed and arranged such that, prior to changing the mapping configuration for the first SIM, the second modem is set to a state where it no longer has a network connection, and then the first SIM is connected to the second modem, and then the second modem connects to a network on behalf of the first SIM. The context of the first SIM may be transferred from the first modem to the second modem at a time when the second modem has no network connection. This can be a particularly fast way of achieving the remapping and new network connection for the SIM.

In an embodiment, the apparatus is constructed and arranged such that the mapping configuration for a SIM is changed based on at least one of: the levels of service achievable by the first and second modems respectively; the subscription capability of at least one of the first SIM and the second SIM; the quality-of-service required of an application running on the wireless device and requiring use of a modem; the levels of service provided by the network at a location of the device; and the prices of the services of each SIM subscription. In embodiments, this allows SIMs to be mapped to modems in a way that is most appropriate and/or that optimises functionality and/or reduces costs for the user.

In an embodiment, the apparatus is constructed and arranged such that information relating to the level of service provided by a particular network in a particular network cell is retrieved from a memory of the wireless device for analysis by the processing system if the device subsequently camps in that network cell to determine whether to change the mapping configuration for a SIM of the wireless device. This provides information on the level of service of a network to the controller, which can be used when deciding whether to connect a SIM to a different modem without the SIM or modem having to interact with the network. In a particular example, the information relating to the level of service provided by a particular network in a particular network cell which is retrieved from a memory may be information relating to the systems supported in that particular network cell, such as 2G, 3G, LTE, etc. This information may have been saved previously from information collected by a modem of the device whilst camped in a particular cell and interacting with a network, or may for example be fetched from an internet server at regular intervals, with the most up-to-date parameters being stored in the memory.

"Wireless devices" include in general any device capable of connecting wirelessly to a network, and includes in particular mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices, various other domestic and non-domestic machines and devices, etc. The term "user equipment" is often used to refer to wireless devices in general, and particularly mobile wireless devices.

FIG. 1 shows schematically a user equipment or wireless device, in this case in the form of a mobile phone/smartphone 100. The user equipment 100 contains the necessary radio system or modem 2, processor(s) and memory/memories 3, antenna 4, etc. to enable wireless communication with the network. The user equipment 100 in use is in communication with a radio mast 5. The radio mast 5 in the example illustrated is in the form of a Node B which is in communication with a Radio Network Controller 6.

Figure 2A:
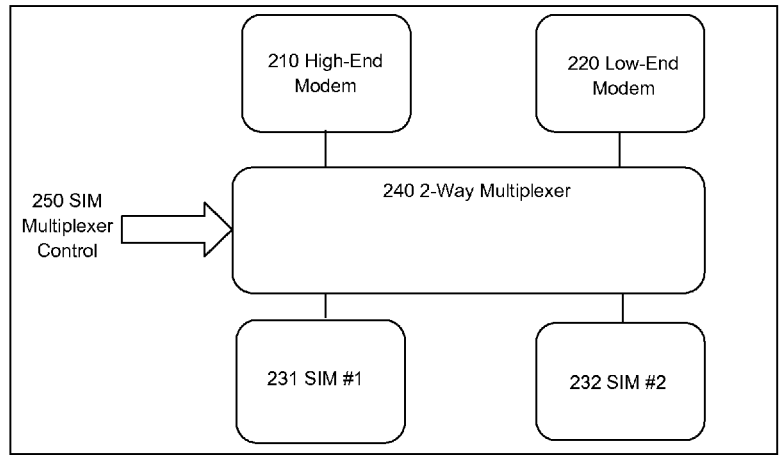
FIG. 2A shows schematically an example of a dual-SIM, dual-modem wireless device according to an embodiment of the present invention.

Referring to FIG. 2A, a first example of an embodiment of the present invention is shown schematically in which a wireless device 100 has two modems 210,220 and two SIMs 231,232. As noted above, "SIM" is used herein to mean that part of a wireless device 100 that provides for the subscriber identity module functionality whether provided by a physical card, software elsewhere in the device, or any other suitable arrangement. The modems 210,220 typically comprise digital baseband and RF (radio frequency) hardware and are used to modulate and demodulate the analogue carrier signals sent between the wireless device 100 modems and the networks to which they are connected.

The two modems 210,220 are different from each other, and thus provide a different level of service from each other. For example, one may be a "high-end" modem 210 and the other a "low-end" modem 220. Modems can, in general, support a range of services. The most basic modems will only support services such as voice calls, SMS (short message services) and MMS (multimedia messaging services) whereas more advanced or sophisticated (and thus typically more expensive) modems will also support data services. The quality of the modem can be judged by the number of and/or quality of services supported by the modem (i.e. the level of service), and thus the term "high-end" is used herein to refer to modems that support a higher level of service than "low-end" modems. Nowadays, most modems support data services at least to some degree, so in a particular example, the level of service of a modem can be judged by considering the quality of data services supported by that modem (i.e. higher quality modems may achieve a higher data speed or lower latency, or be less prone to errors, etc.).

In an example of the present embodiment, the respective connections between the SIMs 231,232 and the modems 210, 220 are provided by a 2-way multiplexer 240. The multiplexer 240 may comprise hardware and/or software or a mixture, and provides dynamic connections between the modems 210, 220 and the SIMs 231,232 as discussed further below.

The dual-SIM device 100 also has a controller 250, such as a SIM multiplexer control (SMC) 250, which decides the mapping and controls the connection of modems to SIMs. This may be provided by for example a processor of the wireless device 100, again by hardware and/or software or a mixture.

The dual-SIM wireless device 100 may comprise other hardware and/or software, such as antenna(s) and relevant processing circuitry, such that the device is able to transmit and receive signals between the device 100 and the network base-stations via the modems 231, 232 for their respective SIMs or SIM channels (i.e. the hardware, software and/or firmware providing service in the device 100 for a particular SIM 231, 232). The hardware and/or software is arranged in this example such that the device 100 is able to interact with the networks of both SIMS 231, 232 simultaneously.

Figure 2B:
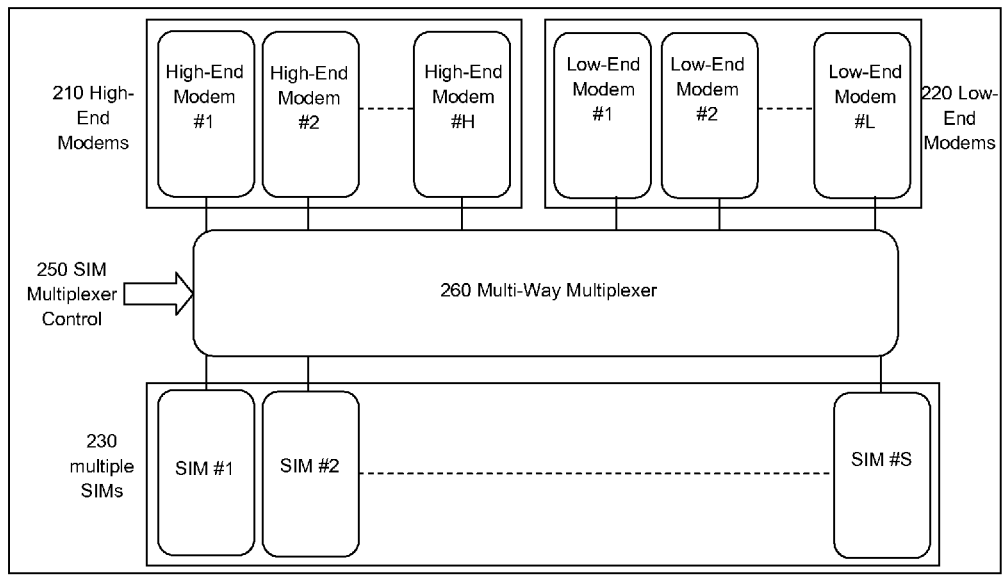
FIG. 2B shows schematically an example of a multi-SIM, multi-modem wireless device having more than two SIMs and more than two modems according to an embodiment of the present invention.

Referring now to FIG. 2B, another example of an embodiment of the present invention is shown schematically, in which a multi-SIM wireless device 100 having more than two SIMs 230 is shown. The device 100 of this example has a number H of high-end modems 210 and a number L of low-end modems 220. The modems 210,220 are each connectable to one of a number S of SIMs 230, where S>1. The numbers H and L can take any number as long as there are at least two modems in total. If S<(L+H), clearly at least one modem 210,220 will not be connected to a SIM 230 at any particular time, and thus the unconnected modem(s) 210,220 cannot be used at that point in time for services for any SIM 230. If S>(L+H), at least one SIM 230 will not be connected to a modem 210,220 at any particular time, and thus this SIM 230 (or, more precisely, services relating to the network subscription for that SIM 230) cannot be used at that point in time. Finally, if S=(L+H), potentially all SIMs 230 can be connected to a respective modem 210,220 simultaneously, thus potentially service can be provided for all SIMs 230 simultaneously.

In the example of the present embodiment shown, the connections between SIMs 230 and modems 210,220 may be provided by a multi-way multiplexer 260, which again may comprise hardware and/or software and provides dynamic connections between the modems 210,220 and the SIMs 230. The multi-SIM device 100 also again has a controller, such as a SIM multiplexer control (SMC) 250, which decides the mapping configuration of and controls the connection of modems 210,220 to SIMs 230.

By varying the number of high-end modems (H) and the number of low-end modems (L), the device 100 can be tailored to suit a range of manufacturing cost limits and feature requirements. So, by way of simple example, in one example of the present embodiment, a first device has L=0 and H=3 and a second device has L=3 and H=0. The first device supports higher level services than the second, but is, in general, more expensive.

For simplicity, the following descriptions of embodiments of the invention will refer to a wireless device 100 with two SIMs 231,232 and two modems 210,220 as shown schematically in FIG. 2A. However, it will be understood that the following descriptions can also apply to the more general case of a multi-SIM, multi-modem wireless device 100 as shown schematically in FIG. 2B.

In one embodiment of the invention, the controller or SMC 250 is arranged to decide on a best mapping configuration for mapping each modem 210,220 to a respective one of the SIMs 231,232.

In one example of the present embodiment concerning the wireless device 100 of FIG. 2A, each SIM 231,232 is originally connected to a respective one of the modems 210,220, but it is decided that in a new configuration, only SIM #2 232 is to be connected to a modem 210,220. In the first configuration, SIM #1 231 is connected to the high-end modem 210 and SIM #2 232 is connected to the low-end modem 220. The SMC 250 will instruct the 2-way multiplexer 240 to disconnect both SIMs 231,232 from the modems 210,220 and then connect SIM #2 232 to the high-end modem 210, thus providing the SIM #2 232 with a different level of service, which is, in general, a higher level of service.

In an alternative example, both SIMs 231,232 are to be reconnected to a respective modem 210,220. The SMC 250 will instruct the 2-way multiplexer 240 to disconnect both SIMs 231,232 from their modems 210,220, as in the previous example, and then connect SIM #1 231 to the low-end modem 220 and SIM #2 232 to the high-end modem 210, thus providing each SIM 231,232 with a different level of service than it previously had.

In the general case of a multi-SIM device, there are many ways in which SIMs can be reconnected to modems. In one embodiment the controller or SMC 250 is able to decide on a best mapping configuration between SIMs and modems and then instruct the multiplexer 260 to reconnect SIMs to modems according to that configuration. In one example, the best mapping configuration is configured in such a way that the Quality of Service (QoS) required by the applications running on the wireless device 100 is met. In another example, the best mapping configuration is configured in such a way that SIMs with higher subscription capabilities are mapped to the higher-end modems. This ensures that the SIMs that support the highest quality data services are connected to modems that are able to deliver such high levels of data services. In a third example, the best mapping configuration is configured in such a way that as many as possible of the services provided by the respective networks are supported by the modems. In a fourth example, an application (i.e. software) running on the device may require a certain fixed mapping between modems and SIMS. If this application is in use, the best mapping configuration is this fixed mapping. As an option, the user may be provided with the facility to specify a "permanent" mapping configuration which the SMC takes to be the best mapping configuration, possibly with that "permanent" mapping being changed (by the user) from time to time as circumstances change (such as subscribing with a new network provider, which offers different services).

In order for the SMC to decide on mapping configurations that would achieve such goals, the SMC receives information about the level of service of at least one of: the SIMs, the modems and the networks. In an example, information about a network to which a particular modem is connected is passed onto the SMC by that particular modem. The modem may be able to indicate to the SMC the network parameters it sees when selecting a new cell, camping on a network, or interacting with the network (interaction with the network may include, for example executing a GPRS (general packet radio service) attach or PDP (packet data protocol) context activation, or participating in active data transfer). In such interactions, the modem will be able to see the type of cellular system the network is operating (e.g. GSM (Global System for Mobile Communications), WCDMA (Wideband Code Division Multiple Access), FDD-LTE (frequency division duplex Long Term Evolution), TDD-LTE (time division duplex LTE), TD-SCDMA (time division synchronous code division multiple access), etc.).

A modem may also be able to gain other information from such interactions. For example, in the case of a GSM system, a modem can see how many time slots the network allocates to the device and can thus get an indication of the network's multislot capability.

In another example, a modem is able to measure the achieved throughput during a first data connection, which helps evaluation of the network data transfer capability.

In a further example, a modem can measure the signal strength of a DL (downlink) signal. This allows the SMC to identify SIMs connected to networks providing high-quality data services but low-quality signals. This may occur, for example, if the cell in which the modem is camped is far away, or if interference from other cells happens to make the radio channel bad. It may be the case that such a network would be less preferable to use than a second network with lower-quality data services, but a higher quality signal. In such a case, the second network may be chosen to be connected to the high-end modem.

In a further example, network information may also be collected without interaction of the device with that network. For example, the regular system information (SI) messages sent by networks may contain useful information, such as the type of services the network supports. For example, the SI 13 message in a GSM system indicates whether the network supports the GPRS service or the newer EGPRS (Enhanced GPRS) service.

In one embodiment, it is possible to store network parameters (in a memory in the device) that have been collected by the modem whilst camped in a particular cell and interacting with a network. Thus, if a modem later camps in that cell, the SMC will have access to that stored information for use in deciding the mapping configuration without the modem having to interact with the network again to obtain this information. In one embodiment, such a memory can also be used to store permanent data such as: the features supported by each network operator; the functionality of the modems; and the subscription capabilities of the SIMs. In a further embodiment, such permanent information can be updated via an application in the device should any of the parameters change. In a particular example, this application can fetch network parameters of a network in a particular area from an internet server at regular intervals, and store the most up-to-date parameters in the memory.

In one example of an embodiment, a first SIM is associated with a network that only supports the traditional 2G and 3G systems (Second Generation and Third Generation systems), whereas a second SIM is associated with a network that supports the newer LTE system. In a simple example, a user may decide to define networks that support newer systems as networks that provide higher levels of service. In this case, the SMC would receive information about the systems supported by the networks and it would then decide a best mapping configuration in which the second SIM is mapped to the high-end modem (which, in this example, has LTE capability), thus providing the wireless device with the highest level of service. If the second SIM were instead mapped to the low-end modem which, in this example, does not have LTE capability, the wireless device would only receive the data services provided by the 2G/3G systems, which are considered to be of a lower quality.

Considering the different cellular systems supported by different networks is the simplest way of comparing network services. However, more complex comparisons can be drawn using other network parameters indicated by the modems. In one example, the SMC is able to compare the different data services supported by the same system. For example, the SMC is able to compare the old R99 data services to the newer HSPA (high speed packet access) data services, each of which is supported by the 3G system.

In another example, the SMC can consider a number of parameters at once. For example, a SIM subscription may only allow voice calls, even though the network can support a higher level of services. In this case, it is the SIM subscription that limits the level of service provided by the SIM. In another example, a SIM subscription allows all data and call services, but the SIM is camped in a cell in which the network only supports the 2G system, which can be considered to provide a lower quality of data services than some other systems (for example the LTE system). In this case, it is the network that limits the level of service.

In another example, the SMC may consider the cost of services to a user. In a particular example, a first SIM/network combination may offer cheaper speech calls than a second SIM/network combination, which offers cheaper data services than the first SIM/network combination. In this case, the SMC may be configured to map the second SIM to a high-end modem so as to achieve a high data throughput, and the first SIM can be mapped to a low-end modem (which might only support voice calls and not data services for example) in order to provide for speech calls.

In a further example, the SMC maps the high-end modem to a SIM whose network supports a system which is preferred by the user. This network may not necessarily offer data services of higher quality. A user may prefer a system that offers a lower quality of data services (such as lower bandwidth) because, for example, it is considered to be more robust than other systems that provide higher qualities of data services (such as those using new technology which might be more prone to errors or loss of service).

In one embodiment, it is possible to repeatedly re-map SIMs to modems and the SMC decides whether to initiate a remapping by considering at least the level of service achieved by the modems and the level of service provided by the networks in a given location. Additional considerations may include, for example, the subscription capabilities of the SIMs, and the services required by applications running on the device.

In an example of such an embodiment, the device is a dual-SIM, dual-modem wireless device and the SIM subscription capabilities of both the SIMs are as high as the network capabilities to which they are connected. The SMC is configured to map the network (and thus SIM) that provides the highest quality data service to the high-end modem and the user has specified that their preference is for a high data speed. In other words, the user has defined the highest-quality data service to be synonymous with the fastest data service and the lowest-quality data service to be synonymous with the slowest data service.

In one example, the device begins with the modem M1 connected to network NWA and the modem M2 connected to network NWB. The SMC receives information on the data speed capabilities of the two networks and the maximum data speed of the modems (i.e. the maximum speed the modems can achieve in a cellular system, given that they are not limited by the network data speed capability). The data speed capability of the networks can be inferred from information received about the networks. To demonstrate this, in a particular example, in which a modem is connected to a GSM network, the SMC receives information that the network supports EGPRS MS CLASS 32 services. From this information, the SMC estimates the data speed capability of the network (assuming very good RF conditions) to be around 80% of the theoretical DL throughput of 296 kbps.

The SMC then defines a data speed S(M1, NWA) as the maximum data speed that can be achieved when modem M1 is connected to network NWA. Similarly S(M1, NWB) is the maximum data speed that can be achieved when M1 is connected to NWB, and similarly for M2, etc. The SMC may then decide that remapping is necessary if S(M1, NWB)>S(M1, NWA). The SMC may optionally also require that S(M1, NWB)>S(M2, NWB) before deciding that remapping is necessary, which ensures that remapping does not occur without benefit. If both conditions are true, the SMC initiates the remapping procedure.

Figure 3A:
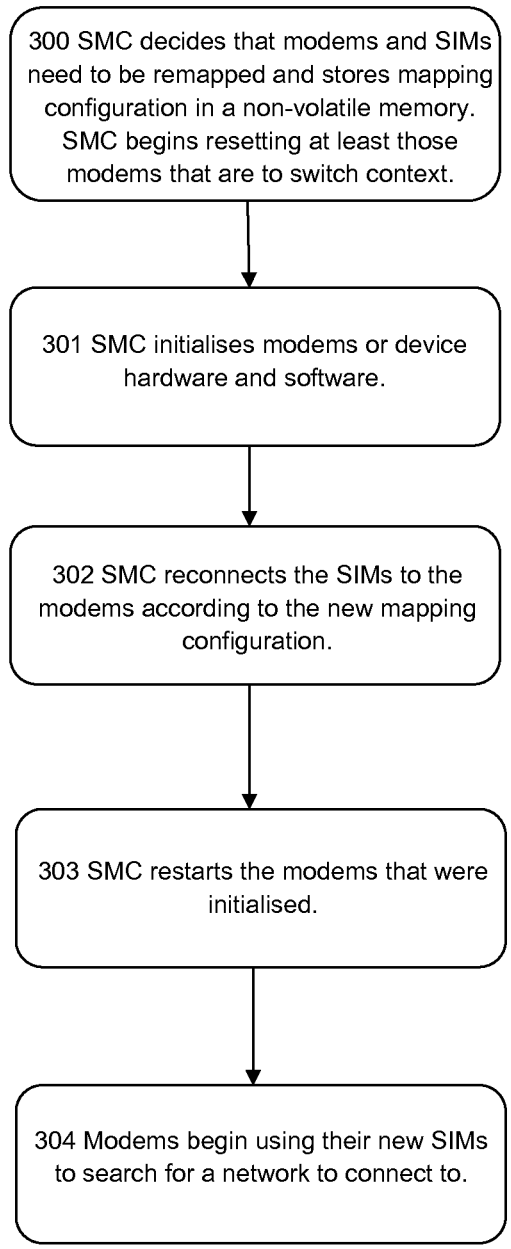
FIG. 3A shows a flowchart illustrating schematically an example of a method of reconnecting SIMs and modems according to an embodiment of the present invention.

In one embodiment, the SMC initiates a remapping procedure by first deciding on a new mapping configuration. This configuration is in one embodiment stored in a non-volatile memory within the wireless device. FIG. 3A shows schematically an example of a remapping procedure where, upon the SMC deciding that the SIMs and modems need to be remapped, and subsequently saving the new remapping configuration in a non-volatile memory of the device, the whole wireless device is reset 300. This means that, firstly, all of the device hardware and software is initialized 301), and then the SIMs are reconnected to the modems according to the mapping configuration stored in the memory 302. The device is then started up in the new configuration in which the mapping has been changed 303. Once the modems have been restarted, they can begin using their new SIMs to search for a network to connect to 304. In another example, just the modem hardware and software is reset. In another example, the modems are not reset, but are simply put into a state with no network connection, and the SIMs are re-mapped to the desired new modems while the modems are disconnected from a network. These types of re-mapping cause the modems to lose network services during the re-mapping, and the modems needs to regain the network services after the SIMs have been re-mapped. This can typically take from a few seconds to several tens of seconds. Therefore, in an alternative example, SIMs are effectively re-mapped to modems on the fly by switching SIM context for the SIM or SIMs that are being mapped from one modem to another. A SIM context can be regarded as the configuration and state information fully describing the ongoing operations for a particular SIM on a radio network. This can be transferred within a very short time period, which can largely for most practical purposes be regarded as being instantaneous.

Modem hardware is typically controlled by modem software, which uses SIM context to monitor the state of the SIM to which the modem is connected. If SIM context is switched while the hardware is active, the modem software can lose track of its SIM context mid-operation. Therefore, the switching of SIM context whilst modem hardware is running can be problematic. As a solution to this, in one example, the SIM context switch occurs whilst the wireless device is in a power-saving DRX (discontinuous reception) idle mode. In such a mode, the device does not have a RRC (radio resource control) connection but receives paging messages from the network at regular intervals. The hardware wakes up to receive paging messages and to execute various other mobility-related measurements (these occur less frequently). The rest of the time, the hardware is "asleep". The device hardware can be considered to be inactive whilst in a DRX idle mode, since the duration of paging receptions are typically much shorter than the duration of time over which the device is asleep. For example, in 2G and 3G systems, paging receptions typically take place every 0.5-2.6 seconds and the durations of such receptions are between milliseconds and tens of milliseconds. Thus, in a DRX idle mode, there is little chance of the hardware being in operation whilst a SIM context switch is occurring. Alternative examples include the switching of context whilst in other power-saving modes such as CELL_PCH (Cell Paging Channel) and URA_PCH (User Registration Area Paging Channel) modes. In such modes, the device can again be considered to be largely inactive as the paging reception periods are short.

There may be other periods of inactivity that are long enough to allow the context switch to take place. For example, there may be other power saving procedures which may be long enough (particularly taking into account the time needed for the device 100 to wake up again, for example to allow clocks to settle, etc.). In such cases, the device 100 may be arranged not to enter the power saving mode and instead to remap the SIMs to the modems, for example by switching the SIM contexts as described. As yet another example, the modems may actually be operational (and thus normally "active"), for example because they are involved in a CELL_DCH (dedicated channel) or other transmission mode, but there may nevertheless be a period of time in which all the modems that are to switch SIM context do not have any operations scheduled that cause outputs from any of the device hardware or software to change the SIM contexts. This period may be long enough to allow a context switch to take place safely. It will be understood therefore that the term "inactivity" as used in this context in the present specification is used broadly to mean a time when the modem is not actively being used in a way that would change the SIM context and thus a remapping of that modem to a different SIM can be carried out, including for example switching SIM context for the SIM or SIMs concerned during the period of inactivity.

Figure 3B:
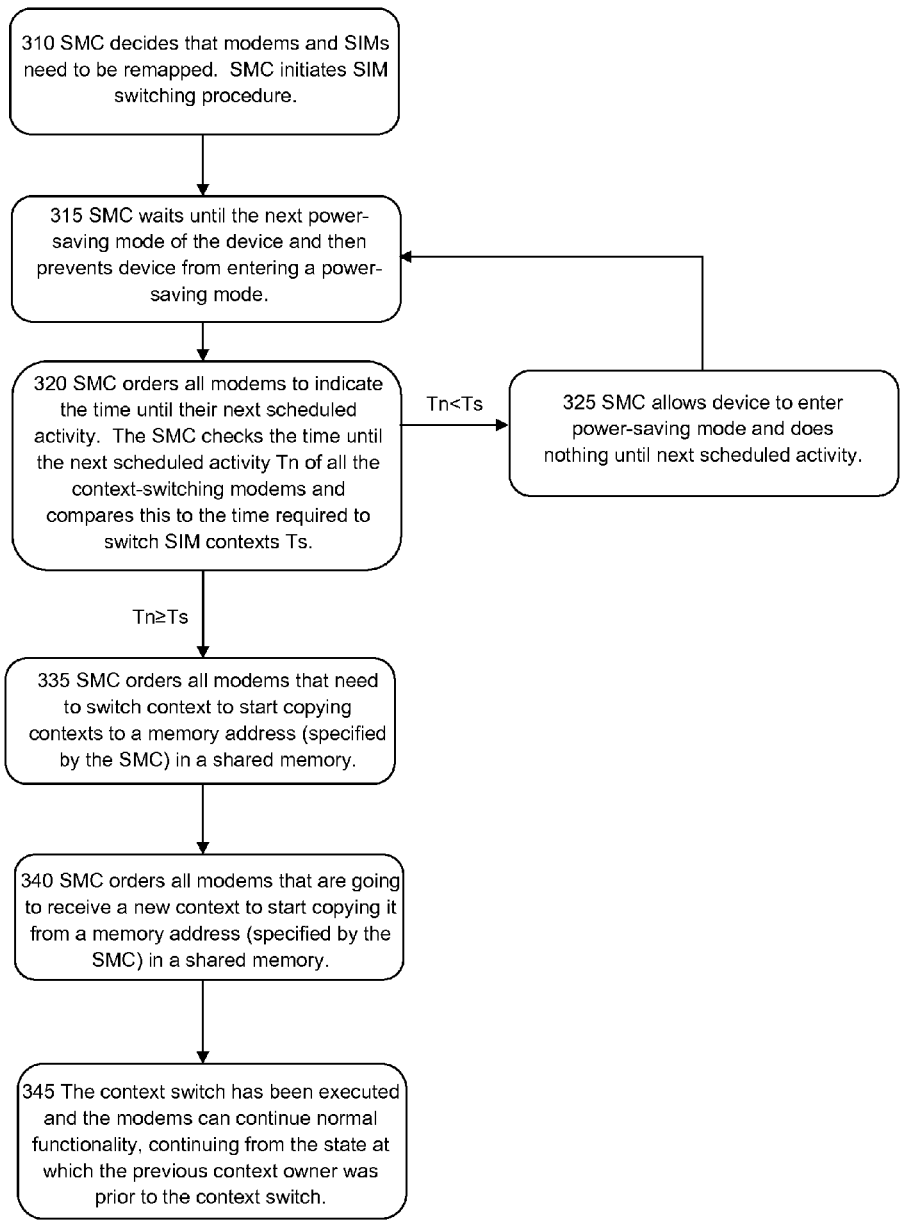
FIG. 3B shows a flowchart illustrating schematically an example of a method of switching SIM context according to an embodiment of the present invention.
Figure 3C:
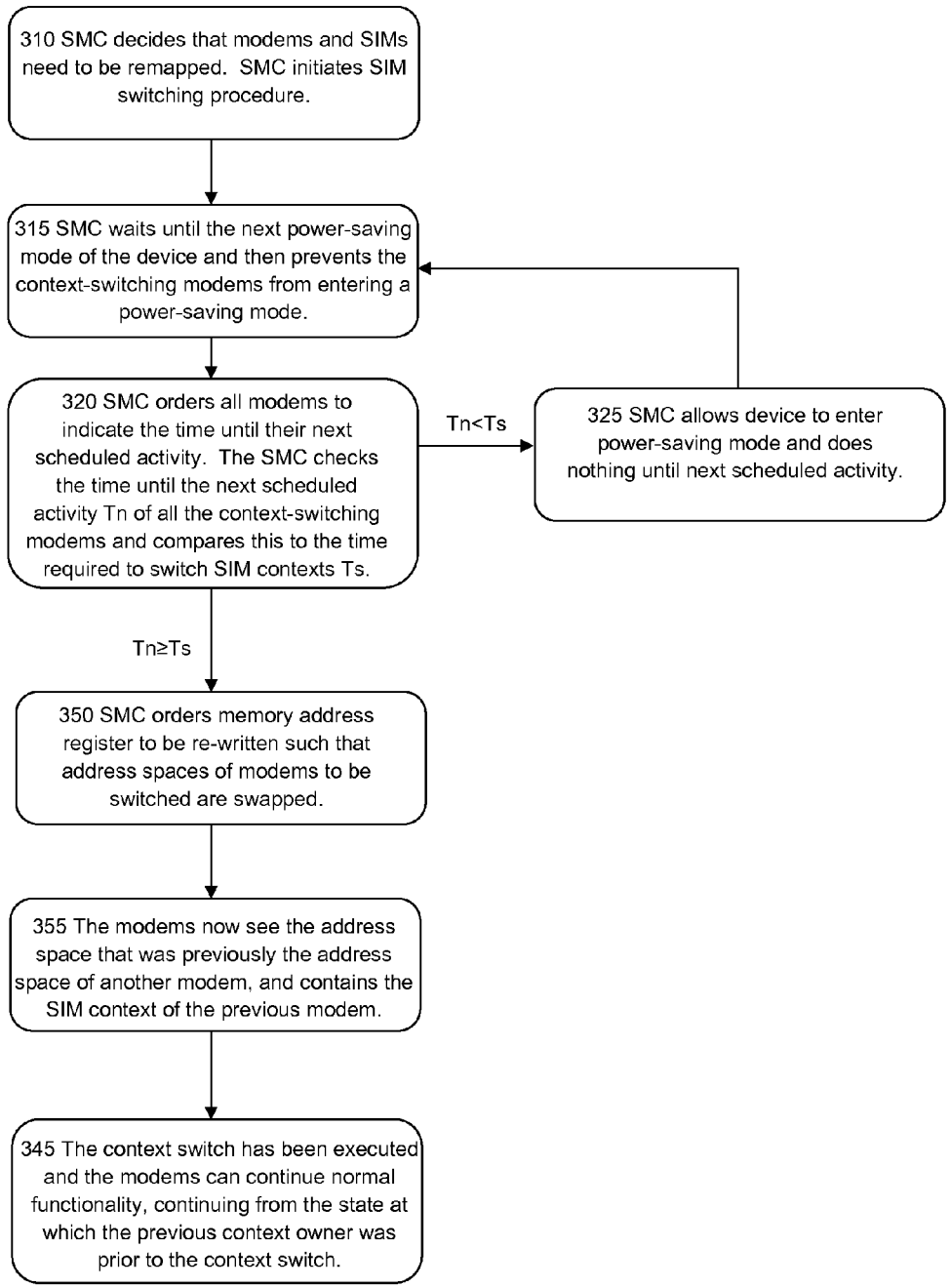
FIG. 3C shows a flowchart illustrating schematically another example of a method of switching SIM context according to an embodiment of the present invention.
Figure 3D:
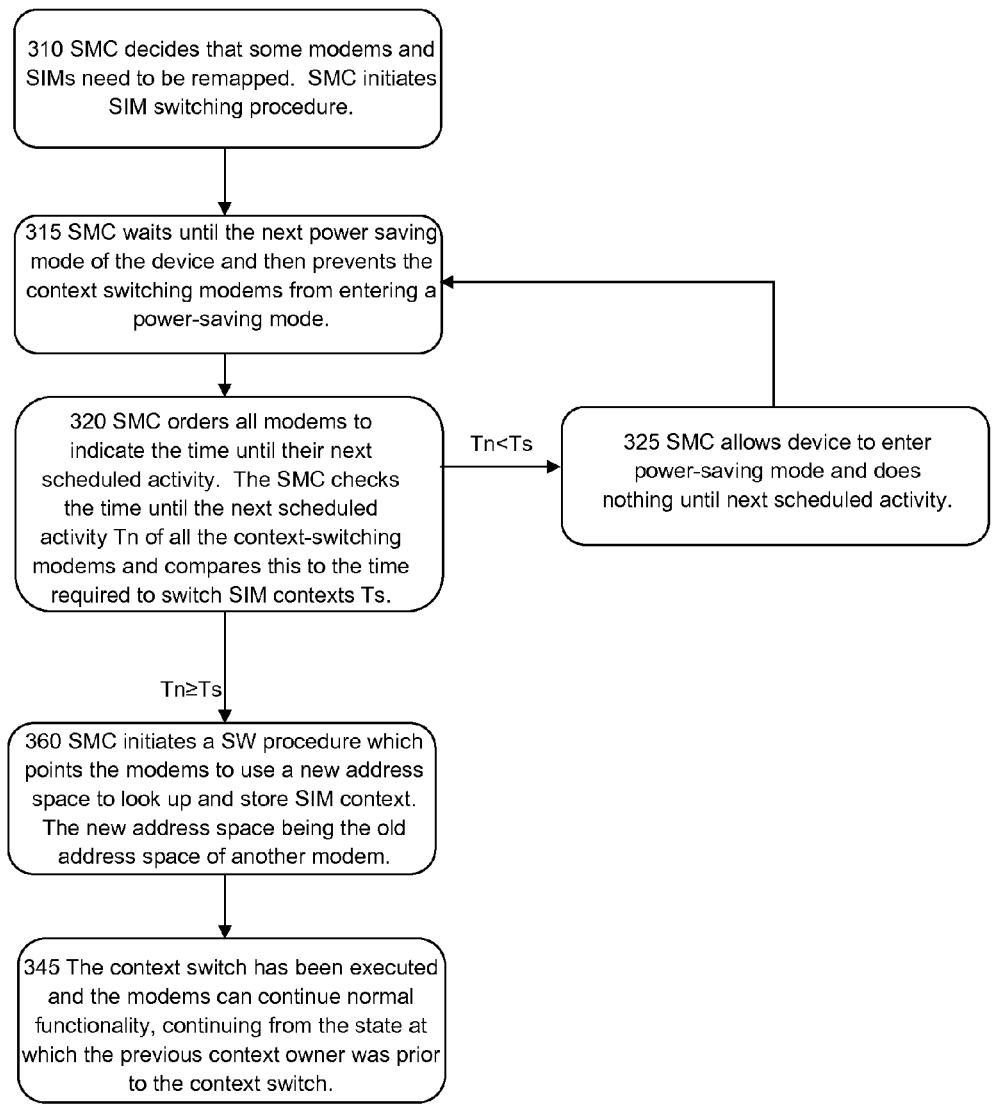
FIG. 3D shows a flowchart illustrating schematically another example of a method of switching SIM context according to an embodiment of the present invention.

FIGS. 3B to 3D show schematically examples of how the SMC may control and arrange the switching of SIM context whilst in a power-saving mode. The wireless device may begin in an active mode, such as a CELL_DCH (Dedicated Channel) or a CELL_FACH (Forward Access Channel) mode, or it may have just received some paging information from the network whilst in a power-saving mode. In each case, the modem hardware will be active. The context needed by a modem to continue normal functionality depends on the state of the modems before the context switch. Thus, in one example, to avoid moving over irrelevant SIM context, the SMC first decides which context is relevant to the modems and only orders this relevant context to be switched.

Referring to FIG. 3B, if the SMC decides (according to methods described previously) that a remapping is required, the SMC begins the SIM context switching procedure 310. In one embodiment of a SIM-switching procedure, the SMC first waits until any operations currently being carried out by the device have been executed. Once executed, the device would usually then enter a power-saving mode to save energy until the next operation needs to be carried out.

Under the usual operation of a wireless device in a power-saving mode, a wakeup event would usually be scheduled before the device enters a sleep mode. This is so that the device knows when it next needs to wake up to enter an active mode, such as the CELL_DCH or CELL_FACH modes. There may also be other programmed wakeup events throughout the power-saving mode, such as paging reception, BSIC (Base Station Identity Code) refresh, SI (System Information) refresh or SIM polling events. The device will know when all of these events are scheduled, and can thus predict for how long the device will be inactive. Instead of entering a power-saving mode immediately after an operation, in this embodiment the SMC delays the entry of the modems that need to switch SIM context into such a mode 315. The SMC then checks the time Tn until the next scheduled wake-up event of the modems that are to switch context, and compares this to the time Ts required to switch SIM contexts 320. The modems that are not switching context carry on as normal, which, in this case, is to enter a power-saving mode, though, more generally, these other modems may alternatively be in active state.

If Tn<Ts, i.e. there is not enough time to switch the SIM contexts before the next wake-up event, then the SMC allows the device to enter a power-saving mode, and does nothing until the next scheduled operation (i.e. the next scheduled wake-up event) 325. Once this next activity has been executed, the SMC again delays the entrance of the modems that need to switch SIM context into a power-saving mode 325 and compares Tn to Ts 320 as described above.

Alternatively, if Tn≧Ts, i.e. there is enough time to carry out a context switch before the next scheduled operation, the SMC orders all modems that need to switch context to remain active and to start copying contexts to a memory address (specified by the SMC) in a shared memory 335. The SMC then orders all modems that are switching context to copy a new context from a memory address (specified by the SMC) in a shared memory 340. Once this has been completed, the context switch has been fully executed and the modems can continue normal functionality, continuing from the state at which the previous context owner was prior to the context switch 345.

It will be understood that in general, the time Ts required to complete the context switch may need to take into account the fact that there will need to be a common time period for the switch to take place for several modems whose periods of activity and inactivity take place at different times and with different timings, including in this specific example the wakeup events which may be scheduled to occur at different times for the different modems.

FIG. 3C refers to an alternative example of a method of SIM context switching which begins in the same way as the previous example. However, instead of a modem copying its SIM context to a memory address in a shared memory, and then copying in a different SIM context from a different memory address in the shared memory to that modem (as in FIG. 3B steps 335,340), the SMC orders the memory address register (which would be included as hardware within the wireless device) to be re-written 350, such that a modem will see a new address space, which was previously the address space for another modem (i.e. a dedicated memory for that modem). Hence the modem will see a new SIM context, which was previously the SIM context of the other modem.

In a specific example, for the case of just two modems, the memory address register would be re-written such that the first modem sees the address space of the second modem, in which the SIM context of the second modem is stored, and the second modem would see the address space of the first modem, in which the SIM context of the first modem is stored. Once the memory address register has been re-written, the context switch has been fully executed, and the modems can continue normal functionality, continuing from the state at which the previous context owner was prior to the context switch 345. This method allows a very fast context switch, which improves the chances that Tn>Ts.

FIG. 3D refers to a further alternative example of a method of SIM context switching which begins in the same way as the previous examples. In this case, instead of a modem copying SIM context to a memory address in a shared memory, and then copying new SIM context from a different memory address in the shared memory to that modem, the SMC in this example initiates a software procedure which points the modems to use a new address space to look up and store SIM context, the new address space being the old address space used by another modem previously and containing the SIM context of the other modem 360. This may be done, for example, by using an appropriate offset variable for each memory area used to describe a context, or by passing a pointer to a memory area to the modems with the SIM context data being accessed dynamically via the pointers. Once this has been completed, the context switch has been fully executed and the modems can continue normal functionality, continuing from the state at which the previous context owner was prior to the context switch 345.

Figure 3E:
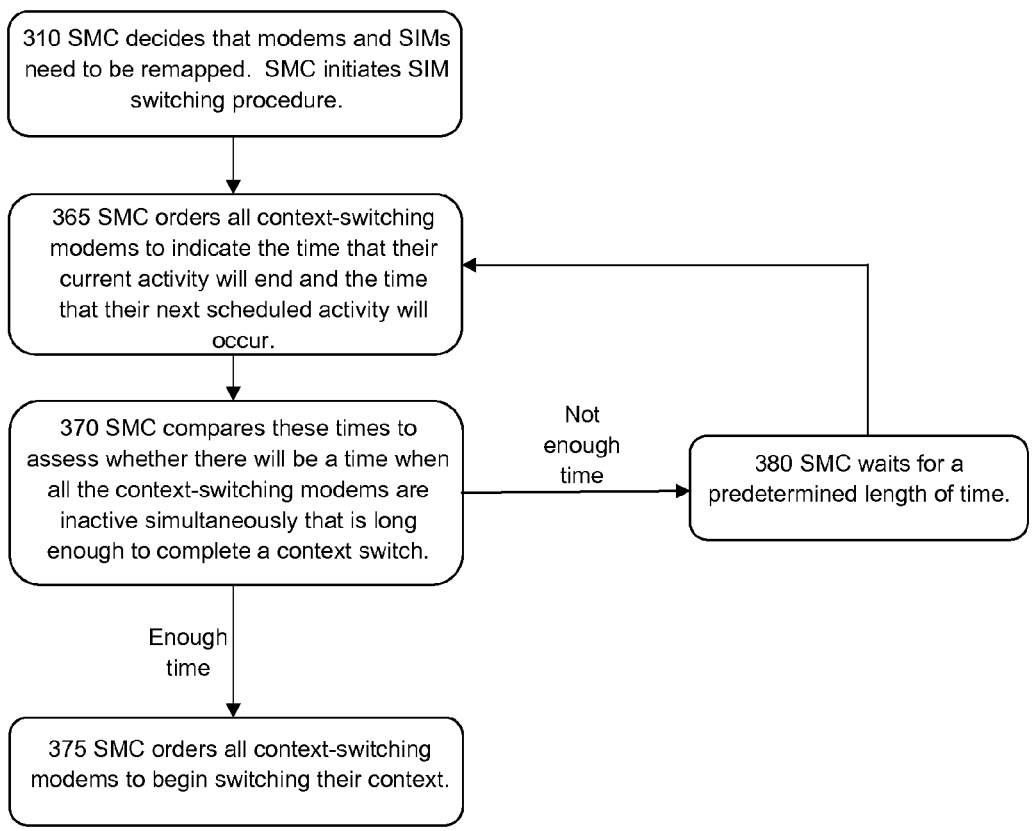
FIG. 3E shows a flowchart illustrating schematically another example of a method of switching SIM context according to an embodiment of the present invention.

Referring to FIG. 3E, an alternative embodiment is shown schematically in which, instead of waiting for the device to enter a power-saving mode before initiating context switching, the SMC orders all modems that are to switch context to indicate when their current activity (if any) will be completed, and when their next activity is scheduled 365. The SMC then compares these times and establishes whether all the modems concerned will be simultaneously inactive for a time that is long enough to complete the context switch 370. It will be noted that the modems may still be "active" during this period (for example, they may be in CELL_DCH mode), but they may not have any operations scheduled for a period of time, and thus in this "inactivity period" the modems can be considered to be inactive. If there is a long enough period of simultaneous inactivity, the SMC initiates the SIM context switching procedure (examples of which were described above) 375. Else, the SMC waits for a predetermined length of time 380 (which in one example can be set by the user, or in another example can be determined by the SMC based on the reported activity times), and then again orders the modems that are to switch SIM context to indicate when their current activities (if any) will be completed, and when their next activity is scheduled 365. Again, the SMC compares these times to establish whether there is a long enough period of simultaneous inactivity to complete the context switch 370.

It may be noted that, in general, the device 100 is trying to find a time gap when all the modems involved in the context switch have no scheduled operations and that this becomes more difficult as the number of modems in the device 100 increases. The device 100 may therefore be arranged such that if a time gap is not found soon enough, i.e. after expiry of some timer say, a forced context switch is executed regardless. Furthermore, the context switch can take place when only the modems that are involved in the remapping have no scheduled operations, and the other modems, which do not need to be involved in a context switch, can continue with their activities unaffected.

In a further alternative example, the context switch is achieved through a combination of one or more of the examples described above.

It may be noted that if context switching is carried out whilst the modems are in a state without network service, to achieve the context switch, it is only required to copy the data necessary to start a registration procedure once the copying is complete, which is less context than is needed to be copied if the modems maintain network service, as in some of the examples above. This kind of context switch can be considered as an intermediate between the complete re-start of the device and the "invisible" context switch while the device is in a power-saving mode described in detail for the examples above.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The above embodiments are to be understood as illustrative examples of the invention. Further embodiments of the invention are envisaged. For example, as mentioned, the multiplexers 240,260 may comprise hardware and/or software or a mixture, and provide dynamic connections between the various modems and SIMs. There may not be a multiplexer as such, and instead the functionality can be provided by a different arrangement in order to achieve the desired mapping configuration for the modems and SIMs. For example, the controller or SMC 250 may cause disconnection of a first SIM from a modem and subsequent connection of a second SIM to that modem by communicating the parameters of that second SIM to that modem. Once the modem receives these parameters, it stops interfacing with the first SIM and begins interfacing with the second SIM. In this sense, the SIMs may just be addresses in some address space of the wireless device 100. As another example, as mentioned, the controller or SMC 250 may itself be a processor or processors, optionally implemented by the main processor or processors of the device 100. It is further to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. Apparatus for controlling a wireless device, comprising:
at least one processor; and
at least one memory including computer program code;
the at least one memory and the computer program code being configured to, with the at least one processor, cause the apparatus at least to:
selectively reconfigure, during wireless communications by the wireless device, connection of at least a first modem and a second modem of the wireless device to at least a first SIM and a second SIM of the wireless device in use such that,
in a first mapping configuration, said first SIM is connected to said first modem and provides wireless communication capability for the wireless device and said second SIM is connected to said second modem and provides wireless communication capability for the wireless device and,
in a second mapping configuration, said second SIM is disconnected from said second modem, and said first SIM is disconnected from said first modem and is connected to said second modem and provides wireless communication capability to the wireless device thereby to provide a different level of wireless communication service for the first SIM than in the first mapping configuration.

2. Apparatus according to claim 1, wherein the at least one memory and the computer program code are further configured to, with the at least one processor, cause the apparatus to connect said second SIM to said first modem in the second mapping configuration and thereby provide additional wireless communication capability to the wireless device via said first modem and said second SIM.

3. Apparatus according to claim 1, wherein the at least one memory and the computer program code are further configured to, with the at least one processor, cause the apparatus to switch a SIM context for said first SIM from said first modem to said second modem when disconnecting the first SIM from the first modem and connecting the first SIM to the second modem.

4. Apparatus according to claim 1, wherein the at least one memory and the computer program code are further configured to, with the at least one processor, cause the apparatus to:
determine, prior to attempting to change a mapping configuration for a SIM of the wireless device, whether the change to the mapping configuration for said SIM of the wireless device can be carried out prior to a next operation of the modem to which said SIM is about to connect, and
initiate the change to the mapping configuration for the SIM if it is determined that the change to the mapping configuration can be carried out prior to a next operation of the modem to which said SIM is about to connect, and otherwise not initiate the change to the mapping configuration.

5. Apparatus according to claim 1, wherein the at least one memory and the computer program code are further configured to, with the at least one processor, cause the apparatus to:
prior to changing the mapping configuration for the first SIM, set the second modem to a state where it no longer has a network connection, and then
connect the first SIM to the second modem, and then
connect the second modem to a network on behalf of the first SIM.

6. Apparatus according to claim 1, wherein the at least one memory and the computer program code are further configured to, with the at least one processor, cause the apparatus to change the mapping configuration for a SIM based on at least one of:
levels of service achievable by the first and second modems respectively;
subscription capability of at least one of the first SIM and the second SIM;
quality-of-service required of an application running on the wireless device and requiring use of a modem;
levels of service provided by a network at a location of the wireless device; and
prices of the services of SIM subscriptions.

7. Apparatus according to claim 1, wherein the at least one memory and the computer program code are further configured to, with the at least one processor, cause the apparatus to:
retrieve information relating to a level of service provided by a particular network in a particular network cell from a memory of the wireless device for analysis by the at least one processor if the device subsequently camps in that network cell to determine whether to change the mapping configuration for a SIM of the wireless device.

8. A wireless device, the wireless device comprising:
at least a first modem and a second modem, the first modem supporting a different level of service than the second modem;
at least one processor; and
at least one memory including computer program code;
the at least one memory and the computer program code being configured to, with the at least one processor, cause the apparatus at least to:
selectively reconfigure, during wireless communications by the wireless device, connection of the first modem and the second modem to at least a first SIM channel and a second SIM channel of the wireless device in use such that,
in a first mapping configuration, the first SIM channel is connected to the first modem and provides wireless communication capability for the wireless device and the second SIM channel is connected to the second modem and provides wireless communication capability for the wireless device and,
in a second mapping configuration, the second SIM channel is disconnected from the second modem, and the first SIM channel is disconnected from the first modem and is connected to the second modem and provides wireless communication capability to the wireless device thereby to provide a different level of wireless communication service for the first SIM channel than in the first mapping configuration.

9. A wireless device according to claim 8, wherein the at least one memory and the computer program code are further configured to, with the at least one processor, cause the apparatus to connect said second SIM channel to the first modem in the second mapping configuration and thereby provide additional wireless communication capability to the wireless device via the first modem and the second SIM channel.

10. A wireless device according to claim 8, wherein the at least one memory and the computer program code are further configured to, with the at least one processor, cause the apparatus to switch a SIM context for the first SIM channel from the first modem to the second modem when disconnecting the first SIM channel from the first modem and connecting the first SIM channel to the second modem.

11. A wireless device according to claim 8, wherein the at least one memory and the computer program code are further configured to, with the at least one processor, cause the apparatus to:
determine, prior to attempting to change a mapping configuration for a SIM channel, whether the change to the mapping configuration for said SIM channel can be carried out prior to a next operation of the modem to which said SIM is about to connect, and
initiate the change to the mapping configuration for said SIM channel if it is determined that the change to the mapping configuration can be carried out prior to a next operation of the modem to which said SIM channel is about to connect, and
otherwise not initiate the change to the mapping configuration.

12. A wireless device according to claim 8, wherein the at least one memory and the computer program code are further configured to, with the at least one processor, cause the apparatus to:
prior to changing the mapping configuration for the first SIM channel, set the second modem to a state where it no longer has a network connection, and then
connect the first SIM channel to the second modem, and then connect the second modem to a network on behalf of the first SIM channel.

13. A wireless device according to claim 8, wherein the at least one memory and the computer program code are further configured to, with the at least one processor, cause the apparatus to change the mapping configuration for a SIM channel based on at least one of:
- levels of service achievable by the first and second modems respectively;
- subscription capability of at least one of a first SIM and a second SIM of the wireless device;
- quality-of-service required of an application running on the wireless device and requiring use of a modem;
- levels of service provided by a network at a location of the wireless device; and
- prices of the services of each SIM subscription.

14. A wireless device according to claim 8, wherein the at least one memory and the computer program code are further configured to, with the at least one processor, cause the apparatus to:
- retrieve information relating to a level of service provided by a particular network in a particular network cell from a memory of the wireless device for analysis by the at least one processor if the device subsequently camps in that network cell to determine whether to change the mapping configuration for a SIM channel of the wireless device.

15. A method of operating a wireless device, the wireless device comprising at least one processor, at least one memory including computer program code, at least a first SIM and a second SIM, and at least a first modem and a second modem, the first modem supporting a different level of service than the second modem, the method comprising:
- selectively reconfiguring, using the at least one processor and during wireless communications by the wireless device, connection of the first modem and the second modem to the first SIM and the second SIM such that,
  - in a first mapping configuration, the first SIM is connected to the first modem and provides wireless communication capability for the wireless device and the second SIM is connected to the second modem and provides wireless communication capability for the wireless device and,
  - in a second mapping configuration, the second SIM is disconnected from the second modem, and the first SIM is disconnected from the first modem and is connected to the second modem and provides wireless communication capability for the wireless device thereby to provide a different level of wireless communication service for the first SIM than in the first mapping configuration.

16. A method according to claim 15, further comprising connecting the second SIM to the first modem in the second mapping configuration and thereby provide additional wireless communication capability to the wireless device via the first modem and the second SIM.

17. A method according to claim 15, further comprising switching a SIM context for the first SIM from the first modem to the second modem when the first SIM is disconnected from the first modem and connected to the second modem.

18. A method according to claim 15, further comprising:
- determining, prior to attempting to change a mapping configuration for a SIM, whether the change to the mapping configuration for the SIM can be carried out prior to a next operation of the modem to which said SIM is about to connect, and
- initiating the change to the mapping configuration for the SIM if it is determined that the change to the mapping configuration can be carried out prior to a next operation of the modem to which said SIM is about to connect, and
- otherwise not initiating the change to the mapping configuration.

19. A method according to claim 15, further comprising:
- prior to changing the mapping configuration for the first SIM, setting the second modem to a state where it no longer has a network connection, and then
- connecting the first SIM to the second modem, and then
- connecting the second modem to a network on behalf of the first SIM.

20. A method according to claim 15, further comprising changing the mapping configuration for a SIM based on at least one of:
- levels of service achievable by the first and second modems respectively;
- subscription capability of at least one of the first SIM and the second SIM;
- quality-of-service required of an application running on the wireless device and requiring use of a modem;
- levels of service provided by a network at a location of the wireless device; and
- prices of the services of each SIM subscription.

21. A method according to claim 15, further comprising retrieving information relating to the level of service provided by a particular network in a particular network cell from a memory of the wireless device for analysis by the at least one processor if the device subsequently camps in that network cell to determine whether to change the mapping configuration for a SIM of the wireless device.

22. A non-transitory computer-readable storage medium comprising a set of computer-readable instructions stored thereon, which, when executed by a processing system, cause the processing system to carry out a method according to claim 15.

* * * * *